Patented June 19, 1951

2,557,062

UNITED STATES PATENT OFFICE 2,557,062

WOOD TREATING PREPARATIONS

James H. Pickren, Jacksonville, Fla., assignor, by mesne assignments, to American Celcure Wood Preserving Corporation, Jacksonville, Fla., a corporation of Florida No Drawing. Application December 12, 1947, Serial No. 791,472

5 Claims. (Cl. 167—14)

This invention relates to wood treating preparations and particularly to wood preservative compositions having high penetrating and toxic characteristics with respect to wood and similar materials.

Heretofore it has been proposed to use cupric chromate as a wood preservative preparation. For instance, in the U. S. patent to Gilbert Gunn #1,684,222 a wood preservative preparation consisting of potassium dichromate and copper sulfate acidified with acetic acid is disclosed. Cupric chromate is one of the compounds produced by the chemical reaction which takes place between these ingredients and while this compound has certain wood preservative characteristics, there are several disadvantages inherent in the use of this type of wood treating preparation. In addition to a lack of high toxicity at commercial concentrations, the composition of the Gunn patent results in the formation of an acid sulfate as a by-product of the same chemical reaction which produces the cupric chromate. This acid sulfate is deposited in the wood and, since it is ionized in water, the presence of moisture is sufficient to make the treated wood electrically conductive to an objectionable degree. Moreover, this composition is not highly penetrative with respect to the wood and this, added to the lack of high toxicity, constitutes a serious disadvantage, although it must be remembered that the composition of the Gunn patent represents an advance over the prior art and has been used extensively in spite of its disadvantages.

One object of the present invention is to provide an improved wood preservative preparation which avoids the formation of acid sulfates or similar salts subject to ionization in the presence of moisture.

A further object of the present invention is to provide a wood preservative preparation characterized by high penetration and high toxicity characteristics.

A still further object of the present invention is to provide a wood preservative preparation having a fixation component for holding the toxic ingredients in the wood fibers, a penetration component for carrying the preparation into the wood and a component of high toxicity for preservation.

I have found that it is possible to achieve the objects set forth above through the interaction of a number of separate but coacting chemical ingredients as hereinafter described.

The specific chemical compounds which I employ as the basic ingredients for the preservative preparation of the present invention comprise the following: (1) a heavy metal salt selected from the group comprising the nitrates, carbonates and hydroxides of copper and zinc, (2) chromic anhydride, (3) phenol sulfonic acid, and (4) water. These basic ingredients of the wood treating preparation of the present invention are mixed in the following range of proportions:

|  | Minimum | Maximum |
|---|---|---|
|  | Per cent | Per cent |
| Heavy metal salt | 1.25 | 4 |
| Chromic anhydride | 0.3 | 4 |
| Phenol sulfonic acid | 1 | 2.5 |
| Water | Balance up to 100% | |

In the above table I mean to include both the use of a copper salt alone, a zinc salt alone, or a mixture of heavy metal salts from the copper-zinc group. It will be noted that the above range for the amount of phenol sulfonic acid is sufficient to provide an excess of phenol sulfonic acid over the amount required to complete the chemical reaction between the active ingredients. This insures the presence of excess phenol sulfonic acid in the final preparation as used. It is my opinion that the beneficial results derived from the use of the preparation of the present invention are derived from the interaction of the chemical compounds produced by the reaction occurring between the basic ingredients set forth above and from the coaction of the compounds thus produced. It is probable that the improved penetrating, preserving and fixing action of the final composition is brought about by the formation of the following chemical compounds (in the case where a mixture of copper and zinc salts are used): (1) copper phenol sulfonate, (2) zinc phenol sulfonate, (3) cupric chromate, (4) zinc chromate, (5) excess phenol sulfonic acid, (6) nitric acid (where copper or zinc nitrate has been used).

In using the wood treating preparation of the present invention the usual well-known methods employed in the art of wood preserving may be used, but it will be found that the combination of high penetration with high toxicity results in a greatly improved preservative action and the absence of acid sulfate salts results in a greatly improved final product with respect to electrical conductivity. In my opinion the improvement thus brought about results from a combination of greater wood penetration induced by the presence of excess phenol sulfonic acid and the increased toxicity resulting from the combined toxic action of a heavy metal phenol sulfonate and phenol sulfonic acid. In the case where a nitrate is used and nitric acid is formed in the ultimate mixture a further beneficial effect is derived from the presence of nitric acid which acts as an oxidizing and fixation agent after the toxic and preservative ingredients have been carried into the structure of the wood. This action is particularly beneficial in connection with action on the lignin of the wood.

As a specific example of a wood preservative preparation embodying the present invention, I have found the following to be particularly useful both from a penetrating and preservative point of view:

| | Moles |
|---|---|
| Copper nitrate, $3H_2O$ | 4 |
| Chromic anhydride | 1 |
| Phenol sulfonic acid | 2 |
| Water | 3 |

The ultimate constituents made available by the formula of the above example are considered to be substantially as follows: 1 mole of copper phenol sulfonate, $6H_2O$; 1 mole of cupric chromate, $2H_2O$; 8 moles of nitric acid; and 4 moles of water plus excess phenol sulfonic acid.

Since many different embodiments of my present invention may be made without departing from the spirit and scope thereof, I do not intend to limit myself to the specific examples given except as defined in the appended claims.

Having thus described my invention, I claim:

1. A wood treating preparation comprising the reaction products of a heavy metal salt selected from the group consisting of copper nitrate and zinc nitrate; chromic anhydride; phenol sulfonic acid in excess and the balance water.

2. The invention of claim 1 in which the heavy metal salt is copper nitrate.

3. The invention of claim 1 in which the heavy metal salt is zinc nitrate.

4. The invention of claim 1 in which the heavy metal salt comprises a mixture of copper nitrate and zinc nitrate.

5. A wood treating preparation comprising the reaction products of the following ingredients in substantially the weight proportions stated: a heavy metal salt selected from the group consisting of copper nitrate and zinc nitrate, 1.25%–4%, chromic anhydride, 0.3%–4%, phenol sulfonic acid, 1%–2.5%, and the balance water.

JAMES H. PICKREN.

REFERENCES CITED

The following references are of record in the file of this patent:

UNITED STATES PATENTS

| Number | Name | Date |
|---|---|---|
| 1,498,639 | Pratt | June 24, 1924 |
| 1,684,222 | Gunn | Sept. 11, 1928 |
| 2,041,655 | Gunn | May 19, 1936 |
| 2,149,332 | Boller | Mar. 7, 1939 |

FOREIGN PATENTS

| Number | Country | Date |
|---|---|---|
| 344,886 | Great Britain | Sept. 10, 1930 |